(12) United States Patent  
Fair

(10) Patent No.: US 6,957,506 B1  
(45) Date of Patent: Oct. 25, 2005

(54) OFFSHORE TREASURE RECOVERY APPARATUS

(76) Inventor: Lindel R. Fair, 11115 FM 1660, Hutto, TX (US) 78634

( * ) Notice: Subject to any disclaimer, the term of this patent is extended or adjusted under 35 U.S.C. 154(b) by 0 days.

(21) Appl. No.: 10/852,500

(22) Filed: May 25, 2004

(51) Int. Cl.[7] .............................................. E02F 3/88
(52) U.S. Cl. ............................................ 37/323; 299/9
(58) Field of Search ........ 56/327.1, 328.1; 37/317–323; 299/8–9; 324/326–329

(56) References Cited

U.S. PATENT DOCUMENTS

| 861,859 | A | | 7/1907 | Johnstone | |
|---|---|---|---|---|---|
| 2,028,580 | A | | 1/1936 | Yedd | |
| 4,289,355 | A | | 9/1981 | Rose | 299/9 |
| 4,352,251 | A | | 10/1982 | Sloan | 37/58 |
| 4,359,686 | A | | 11/1982 | Wherry | 324/326 |
| 4,499,713 | A | * | 2/1985 | Stone | 56/328.1 |
| 4,889,391 | A | | 12/1989 | Cornelius | 299/9 |
| 5,647,691 | A | | 7/1997 | Wirth | 405/74 |
| 5,771,530 | A | | 6/1998 | Rodriquez | 15/339 |
| 5,970,635 | A | | 10/1999 | Wilmoth | 37/323 |
| 6,494,674 | B1 | * | 12/2002 | Cameron | 415/124.2 |

* cited by examiner

Primary Examiner—Robert E Pezzuto  
(74) Attorney, Agent, or Firm—Chris Whewell

(57) ABSTRACT

Provided herein is a device useful for recovering valuable metallic objects which are located in a submerged location, such as beneath the sand or mud off the shore of a beach or riverbank. A device according to the invention first locates a metallic object using a conventional metal detector comprising a coil that is disposed about the end of a pickup conduit. Once a metallic object is located, the operator causes the sand, mud and other debris in the vicinity of the end of the pickup conduit to be admitted into the device and filtered through a recovery basket which comprises a mesh or screen. Valuable objects so located and collected are readily recovered by the operator of the device by opening a door portion which is integral to the recovery basket. By its configuration, the weight distribution of a device according to the invention is such that it may be used for extended periods by an operator without undergoing fatigue.

14 Claims, 7 Drawing Sheets

OFFSHORE TREASURE RECOVERY APPARATUS

TECHNICAL FIELD

This invention relates generally to recovery of lost items of value. More particularly, it relates to a device useful for locating and recovering metallic objects which were previously lost by their possessor in an area that is currently covered by water.

BACKGROUND

People have valued various metallic objects since early times when metallic wares were first fabricated and worn about the body for ornamental or functional purposes, in addition to the use of various metals as the basis for coinage. As is well known, valuable metals and alloys commonly include silver, gold, copper, and other metals such as those in Group VIII of the transition metals in the periodic table of the elements. Typically, valuable manufactures which comprise valuable metals include rings, earrings, wristwatches, necklaces, pendants, belt buckles, and coins.

It is not uncommon for the possessor of a valuable metallic ware to lose it. Often, coins fall out of the pockets of a garment that a person is wearing. Necklace clasps may become loosed, causing the necklace to fall from the person's neck, unnoticed. During physical activity, such as sports or other play, it is relatively easy for an item to be lost during the play, only to be noticed as missing several hours later, with the person who lost the ware being uncertain as to exactly where or when the item was lost.

One location where valuable metallic items are typically lost is along a beach shoreline, since when an item is dropped in sand, it does not make a sound. Further complicating this are cases where items are lost by persons bathing, such as in a lake, ocean, river, or other body of water. Even if the person is aware of the instant at which the object is lost, it is frequently impossible to locate the article, since the floor of the ocean, lake, river, etc. typically comprises mud or sand, into which the relatively heavy metallic object sinks or settles. Losing an item on a beach at low tide will often cause the item to be submerged beneath water at high tide. It is believed that millions of dollars of precious metal in the form of fabricated jewelry and coins lies in unknown locations beneath the floor of oceans, lakes, rivers, and like bodies of water. In addition, there are natural deposits of precious metals, such as gold nuggets, which reside in the bottoms of mountain streams.

Various workers in the prior art aware of the enormous value of metallic items which lie submerged beneath the floor of a body of water have provided a plurality of devices and methods designed for the recovery of such values. The following items in the prior art of US patents are each incorporated by reference hereto, in their entirety. U.S. Pat. No. 861,859 teaches a prospecting tool having a case adapted to be driven into the earth, a member operating therein and adapted to raise a quantity of earth, and a basket attached to the upper portion of the case and constituting a screen through which water may pass. U.S. Pat. No. 2,028,580 provides a hydraulic suction nozzle having: a) a tubular shaft having a longitudinal external groove therein; b) a port connecting the groove with the duct of the shaft; c) a closure member for the port engaged entirely in the groove; and d) a means to fix the closure member in either operative or inoperative relation to the port while disposed in the groove. U.S. Pat. No. 4,289,355 sets forth an improved dredge having a pump; a sluice box; a distributor box having a front wall, a target plate fixedly mounted in the distributor box with the target plate substantially evenly distributing into the sluice box water and solids entrained in the water which impinge the target plate; and a flexible conduit having an inlet end and an outlet end, with the conduit having an outer surface having a helical projection, and wherein the conduit is operationally connected to the pump. The improvements comprise: a) a flange mounted on the front wall of the distributor box, wherein the flange has a bore sized to receive a flexible conduit within it, and the bore has a helical indentation to receive the helical projection of the flexible conduit, and wherein the outlet end of the flexible conduit is threaded into the bore of the flange; b) a bore through the front wall of the distributor box sized and positioned so that the outlet end of the flexible coupling can project into the distributor box; whereby the distance between the outlet end of the flexible conduit and the target plate can be varied by rotating the conduit relative to the flange. U.S. Pat. No. 4,352,251 discloses a portable, lightweight, hand operated dredge head and for being held by the arms of a diver operator for underwater excavating, comprising: a) a tubular suction nozzle having a lower inlet end and an open upper end for the entry of water therein; b) a tubular discharge branch extending from the nozzle and at a point intermediate the length of the tubular nozzle, wherein the tubular branch has a discharge end for connection to a suction pipe for conveying excavated material away from the head; c) a swivel coupling means between the discharge end of the branch and the suction pipe whereby the head can be rotationally swiveled relative to the suction pipe and quickly detachably connected thereto; and d) a hand operated valve pivotally mounted in the nozzle adjacent its upper end. There is an operator's handle secured to the valve and extending from the nozzle for permitting the diver operator to move the valve to any adjusted position between a closed position and an open position and for thereby varying the amount of water introduced through the valve and into the nozzle to thereby vary the suction at the lower inlet end of the nozzle. U.S. Pat. No. 4,359,686 describes a metal detection apparatus comprising: a) a nonmetallic basket means having a top portion, a side wall portion, an open bottom, and a blade portion for scooping material into the basket means through the open bottom; b) a handle means having a first end attached to the basket means; c) a metal detection coil means for detecting metal objects; and d) a pivotal mounting means for pivotally mounting the metal detection coil means with respect to the basket means and for holding the metal detection coil means in a first search position proximate and at least partially covering the open bottom for detection of metal objects, and for permitting the metal detection coil means to pivot to a second position within the basket means as the basket means fills with material. U.S. Pat. No. 4,889,391 teaches a hand-held suction dredge and metal detector comprising: a) a hollow pipe adapted to be carried in a vertical position; b) a metal detector having a central aperture supported for sliding movement on the pipe with the lower pipe end extending therethrough for receiving and transmitting at least partially fluid material therethrough; c) a spring means urging the metal detector toward an initial position at the lower end of the pipe; d) a fluid jet means positioned in the pipe directed upward therein; e) a pump means supported by the pipe and connected to the fluid jet means to circulate fluid therethrough to create a suction in the pipe to draw at least partially fluid material from the bottom end through the pipe to discharge the same from the upper end of the pipe, and f)

a basket means supported on the upper end of the pipe having openings sized to permit discharge of at least partially fluid material and retain larger metal solids therein. The pipe is operable in use to support the metal detector adjacent to a region being investigated and to dredge material therefrom by operation of the pump means and, a motor means supported by the pipe above the upper end of the pipe for operating the pump means. U.S. Pat. No. 5,647,691 provides an apparatus for removing mud and silt ecologically safely from a waterbottom without destroying benthos contained therein, comprising: a) a source of air under pressure; b) a weighted body having a large aperture disposed therethrough and a suction chamber therein; c) a discharge conduit having a first end and second end, the discharge conduit first end connected to the aperture of the weighted body and connected in fluid communication with the suction chamber therein; d) an air supply conduit having a first end and second end, the air supply conduit connected at the first end to the source of air under pressure and at the second end, to the suction chamber in the weighted body, the air conduit second end including a means for generating bubbles; e) a filtered container connected to the second end of the discharge conduit, whereby mud and silt can be removed by directing air under pressure into the suction chamber where it forms bubbles which rise up through the discharge conduit; f) a source of water under pressure; g) a water conduit having a first end and a second end, the water conduit first end connected to the source of water under pressure, and the second end connected, in fluid communication, to a plurality of water jet nozzles connected to the weighted body; and h) a means for controlling each of the plurality of water jets, connected between the first end and the second end of the water conduit, wherein the weighted body moves in a predetermined direction responsive to activated water jet nozzles. U.S. Pat. No. 5,771,530 sets forth a shell casing retrieval system comprising: a) a plenum; b) a shell casing pickup tube having two end portions and having a shell casing pickup head on one end portion thereof and being attached to the plenum at the other end portion thereof; c) a metal detector attached to the pickup tube adjacent the shell casing pickup head; d) a shell casing recovery container attached to the plenum for collected shell casings being drawn through the pickup tube; and e) a vacuum connection attached to the plenum for connection to a vacuum source for placing a negative pressure in the plenum and pickup tube to draw shell casings detected by the metal detector into the plenum and into the shell casing recovery container responsive to a negative pressure being placed on the shell casing pickup tube.

U.S. Pat. No. 5,970,635 discloses a system for dredging material from a ground surface below a body of water, comprising: a) a dredge head housing having a pair of spaced side walls, a tail piece extending between rear ends of the side walls and a top cover extending between top edges of the side walls, thereby forming an enclosed agitation chamber having an open bottom opposite the top cover and an intake opening opposite the tail piece for receiving material from the ground surface into the agitation chamber, thereby forming a dredge line in the ground surface; b) a feed line connected to and extending away from the housing for supplying a pressurized fluid; c) a fluid manifold within and connected to the housing and fluidly connected to the feed line for receiving the pressurized fluid, the manifold comprising a plurality of cutting outlets for injecting the pressurized fluid onto material in front of and entering the intake opening, thereby liquefying the material into an agitated mixture; d) the top cover defining a discharge opening for exhaust of the agitated mixture, the manifold including at least one upwardly-directed lift outlet for discharging pressurized fluid to urge the agitated mixture towards and into the discharge opening; and e) a a riser chute connected to and extending upward from the discharge opening to a free end of the riser chute, the free end having a chute opening, whereby the riser chute directs the liquefied material upward and into the body of water for transfer away from the dredge line.

However, each of these devices of the prior art and methods associated with their use are not without limitations. It is an object of the present invention to provide a device for simultaneous location and recovery of metallic items which reside submerged beneath the floor of a body of water. It is a further object to provide such a device which can be operated by a single user. It is a further object still to provide such a device which is lightweight in construction, and which can be taken down to fit within a small storage space. It is a further object still to provide such a device having increased efficiency and ergonomics by virtue of its design and weight distribution over the devices of the prior art.

SUMMARY OF THE INVENTION

The present invention provides a device useful for detecting and retrieving metallic objects from underwater locations, comprising: a) a substantially linear shaft housing having a first end portion, a second end portion, and a hollow interior space, inside of which space is disposed a drive shaft, the drive shaft having a first end portion and a second end portion; b) a liquid pump having an impeller, a fluid inlet, and a fluid outlet, wherein the impeller is in effective mechanical contact with the second end portion of the drive shaft; c) a substantially linear main conduit portion having an inlet end portion, an outlet end portion, and an interior space; d) a transfer conduit means for conveying liquid from the fluid outlet of the liquid pump to the inlet portion of the main conduit portion; e) a pickup conduit having a first end portion, a second end portion, and an interior space, wherein the first end portion of the pickup conduit is attached to the main conduit such that the interior spaces of the main conduit and the pickup conduit are in effective fluid communication with one another; and f) the detector coil portion of a metal detecting means annularly disposed about the pickup conduit portion, wherein the shaft housing and the main conduit portion are oriented to be substantially parallel to one another.

DETAILED DESCRIPTION

Figure 1:
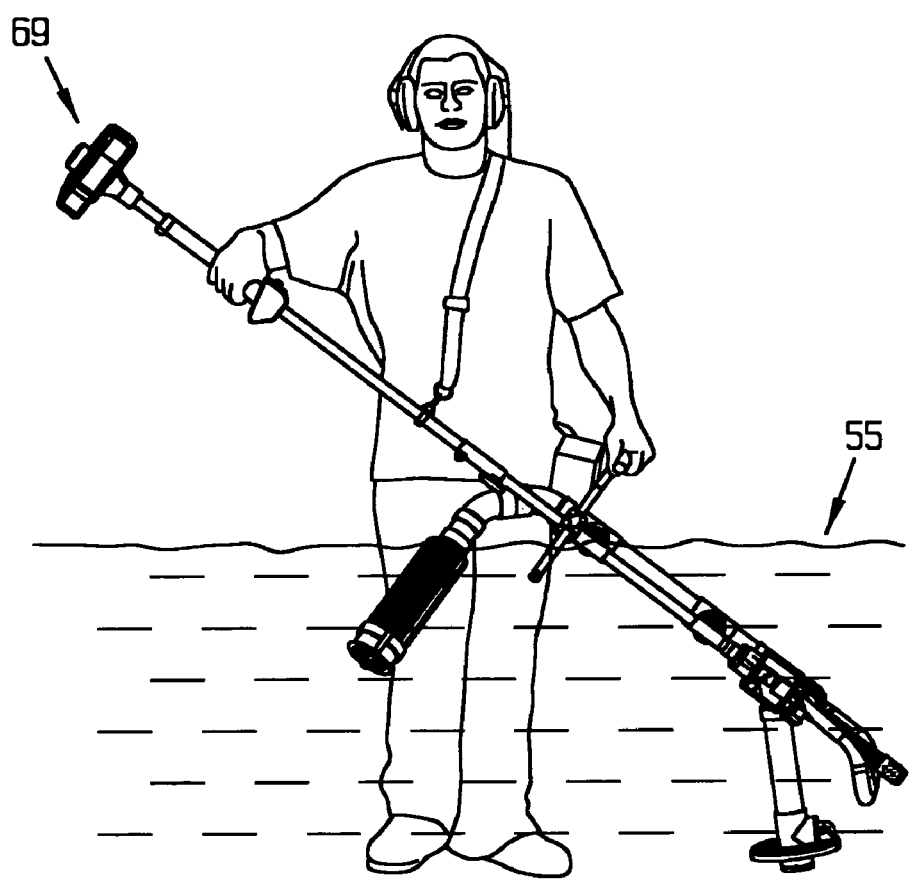
FIG. 1 shows a front perspective view of a person using a device according to the present invention.

Referring to the drawings, and initially to FIG. 1 there is shown a man using a device according to a preferred form of the invention 69 to search for valuable metallic objects residing in a submerged location beneath the surface of a body of water 55.

Figure 2:
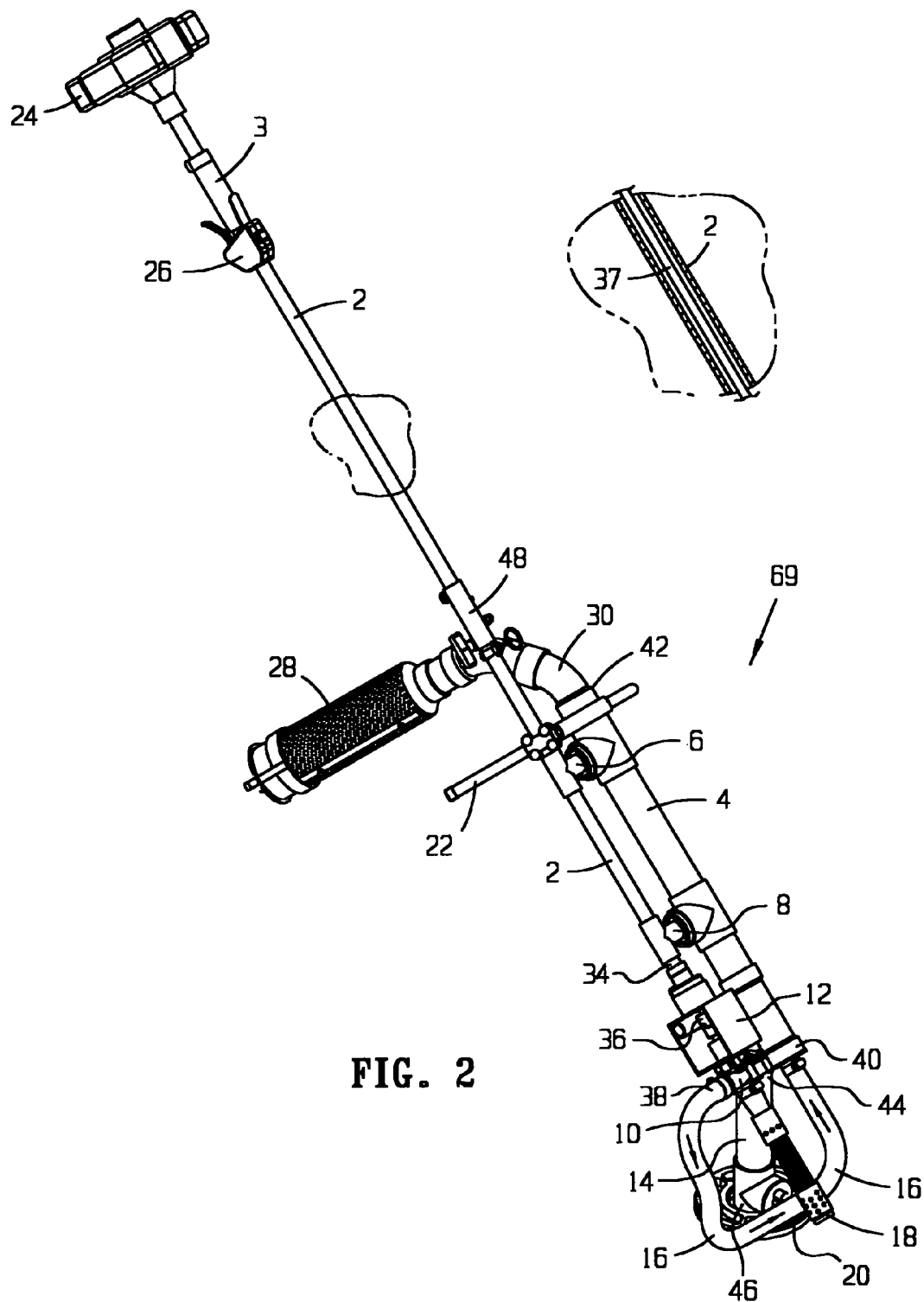
FIG. 2 shows a perspective view of a device according to the present invention.

FIG. 2 shows a perspective view of a device according to a preferred form of the present invention, which includes a shaft housing 2 that is substantially linear and has a first end portion 3, a second end portion 34, and comprises a hollow interior space, inside of which space is rotably disposed a drive shaft 37. The drive shaft 37 has a first end portion (137, FIG. 4) and a second end portion 36, with the first end portion of the drive shaft being disposed towards the first end portion 3 of the shaft housing 2, and wherein the second end portion of the drive shaft is disposed towards the second end portion 34 of the shaft housing 2. There is a liquid pump 10 which has an impeller (212, FIG. 10), a pump inlet 18, and a fluid outlet 38. The impeller of the pump is in effective mechanical contact with the second end portion of the drive shaft. There is a motor 24 disposed at the first end portion of the shaft housing 2, which motor has an output shaft that is in effective mechanical contact with the first end portion of the drive shaft, which causes the pump impeller to be turned when the motor 24 is energized, such that when the pump inlet 18 is submerged in water, water is caused to be admitted to the pump inlet and discharged under a higher pressure at the pump outlet 38.

There is a substantially linear main conduit portion 4 which has an inlet end portion 40, and an outlet end portion 42. The main conduit portion 4, is preferably a hollow tube or pipe, such as a polyvinylchloride (PVC) tube, which thus inherently includes an interior space. To the pump outlet 38 is connected a transfer conduit means 16 for conveying liquid from the fluid outlet of the liquid pump to the inlet portion of the main conduit portion 4. There is a pickup conduit 14, which is preferably a hollow tube or pipe of the same or smaller diameter as the main conduit portion 4, which has a first end portion 44 and a second end portion 46 and which also inherently includes an interior space. The first end portion 44 of the pickup conduit 14 is attached to the main conduit 4 such that the interior spaces of the main conduit 4 and the pickup conduit 14 are in effective fluid communication with one another. There is also the detector coil portion 20 of a metal detecting means annularly disposed about the second end portion 46 of the pickup conduit 14. According to a preferred form of the invention, the shaft housing 2 and the main conduit portion 4 are oriented to be substantially parallel to one another, by means of couplings 6 and 8, which may be pieces of tubing connectively attached to each of the shaft housing 2 and the main conduit portion 4, or brackets, or other conventional fastening means known in the art, such as brackets and the like.

There is a recovery basket 28 that is attached to the outlet end portion 42 of the main conduit 4 by means of a connecting tubing 30 which is non-linear and preferably comprises a bend. By varying the angle of the bend in the connecting tubing 30, it is possible for the recovery basket 28 to be attached to the outlet end portion 42 of the main conduit portion 4 at any degree between about 60 degrees and 110 degrees, with a bend of about 90 degrees being most preferable. Stated another way, the direction of flow of water emitted from the main conduit portion 4 enters the recovery basket 28 in a direction that is between about 60 degrees and about 110 degrees angled with respect to the travel of the water through the main conduit portion 4. The recovery basket 28 is comprised of a mesh which permits the passage of water but retains small metallic objects by virtue of the metallic objects being larger than the holes in the mesh. Preferably the mesh is comprised of a polymeric material, such as PVC or polyolefin, or a metal such as aluminum or steel.

During operation of this device, the lower portion of the device is submerged in a location where valuable metallic objects are believed to be located, such as about 10 feet offshore from a beach area that is popular for swimming, as shown in FIG. 1. The metal detecting means, (which may be any metal detection system known in the art to comprise a pickup coil, signal processing circuitry, and a means for communicating to the operator that a metallic object has been located, such as an audible tone or visual signal), is then employed to locate a metallic object that is, for example, buried in the sand offshore. Once an object has been located by virtue of the metal detector coil 20 having located such object, motor 24 is energized by actuating the throttle control means 26, which in turn causes the drive shaft 6 contained within the shaft housing 2 to be rotated, which drives the impeller within the pump 10, thereby causing water to be admitted into the pump inlet 18 and expelled from the pump outlet 38 under pressure through transfer conduit 16 into the inlet 40 of the main conduit 4. By a venturi effect, this causes a reduced pressure to exist at the second end portion 46 of the pickup conduit, which effectively "sucks up" sand and other items, including the valuable object located by the metal detecting means, into the pickup conduit, which sand and other items are caused to be transported through the main conduit 4 and to eventually cause water, sand and other objects smaller than the mesh of the recovery basket 28 to be discharged to the outside of the recovery basket 28, while retaining objects larger than the mesh size of the recovery basket. Inspection of the recovery basket 28 will yield the metallic object that was detected by the metal detecting means within the recovery basket 28, which are retrievable therefrom by opening the recovery basket 28.

Also shown in FIG. 2 is a handle means 22 which is useful for giving the operator added leverage in carrying or manipulating the device 69 as a whole. The handle means 22 may be affixed to either the shaft housing 2, the main conduit 4, or both, by conventional means such as rivets, brackets, etc. Other illustrations in the drawings provided will further illustrate the preferred orientations of the various components of the invention with respect to one another in the finished device.

The main conduit portion 4, the pickup conduit 14, and the connecting tubing 30 are all preferably comprised of a polymeric tubing material, such as PVC, CPVC, polyolefins such as polypropylene, polyethylene, etc., but may also be comprised of metals and various metallic alloys, such as aluminum. However, for providing a device according to the present invention having a low and easily manageable weight, it is preferred that these components are comprised of PVC tubing having about a 2 inch inner diameter. The transfer conduit 16 is preferably a polymeric hose, preferably reinforced, such as a PVC hose.

The shaft housing 2 is preferably of metallic construction, for strength, and metals such as steel or aluminum are preferable. The shaft housing 2 may optionally comprise a joint 48 at which the shaft housing can be broken down, for compactness in transport.

Figure 3:
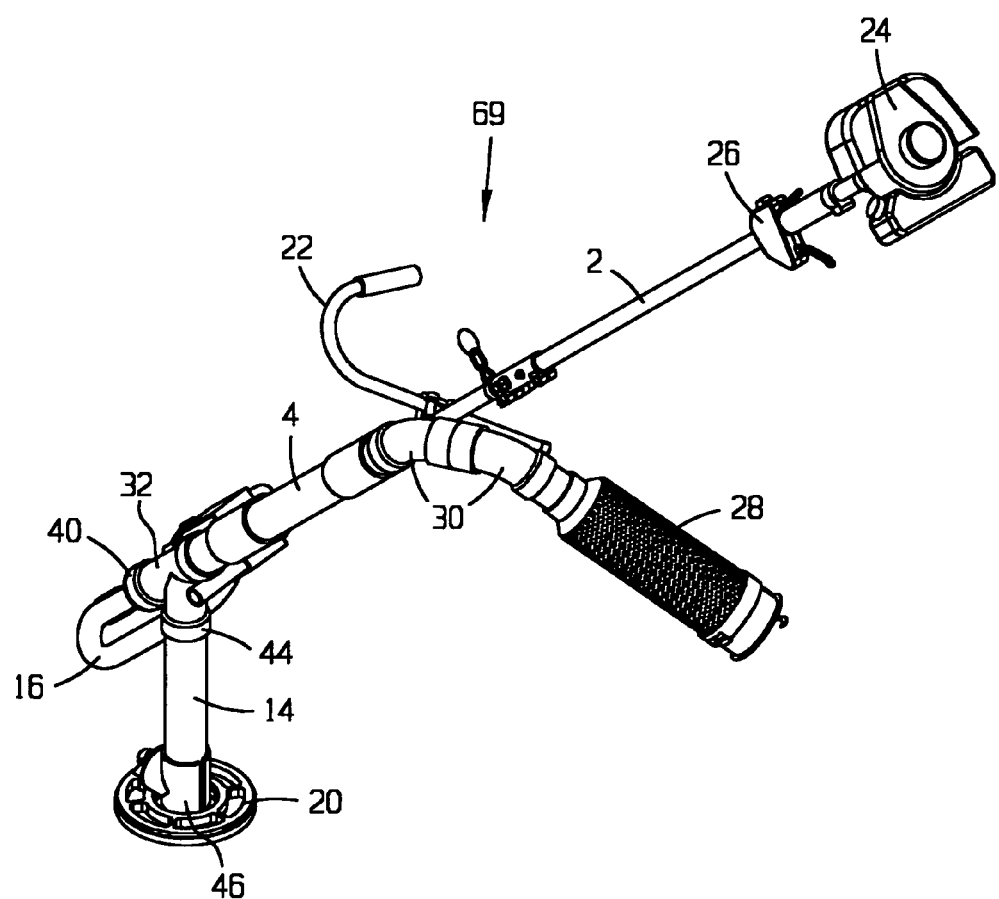
FIG. 3 shows a perspective view of a device according to the present invention from the left side.

In FIG. 3 is shown a perspective view of a device according to the present invention 69 from the left side for further clarity in understanding the respective locations of the various elements of the invention in one of its preferred froms, including the metal detector coil 20, the second end portion 46 of the pickup conduit 14, the first end portion 44 of the pickup conduit 14, the inlet 40 of the main conduit 4, the transfer conduit 16, bend 30, recovery basket 28, shaft housing 2, motor 24, throttle control 26, and handle means 22.

Figure 4:
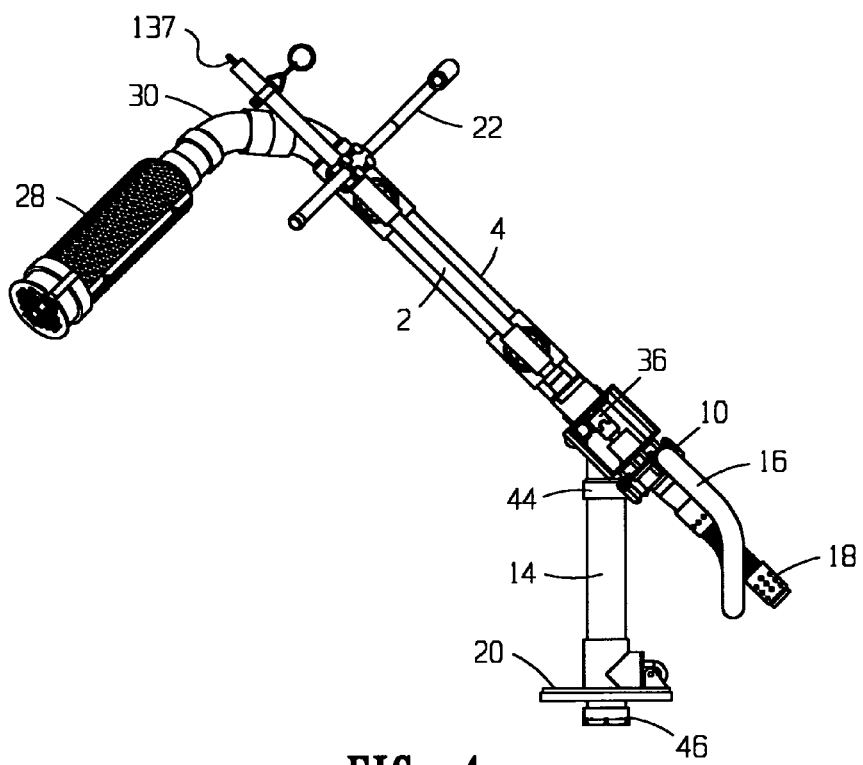
FIG. 4 shows a side perspective view of a device according to the present invention.

In FIG. 4 is shown a side perspective view of a device according to the present invention for further clarity in understanding the respective locations of the various elements of the invention in one of its preferred forms, including the metal detector coil 20, the second end portion 46 of the pickup conduit 14, the first end portion 44 of the pickup conduit 14, the inlet 18 of the pump 10, the main conduit 4, the transfer conduit 16, the second end portion 36 of the drive shaft 37, bend 30, recovery basket 28, shaft housing 2, the first end portion 137 of the drive shaft 37, and handle means 22.

Figure 5:
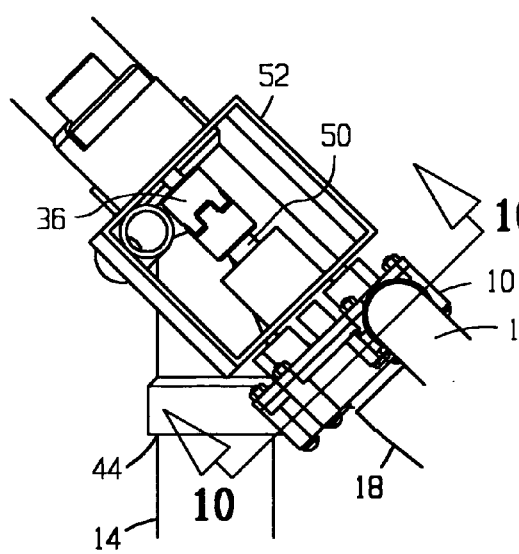
FIG. 5 shows a side perspective view of the coupling enclosure sub-combination of a device according to the present invention.

In FIG. 5 is shown a side perspective view of the coupling enclosure sub-combination of a device according to the present invention. In this figure is shown the second end portion 36 of the drive shaft 37 (FIG. 1) in effective mechanical contact with the shaft 50 of the impeller contained in pump 10 (see also FIG. 10). Also shown is the first end portion 44 of the pickup conduit 14. In one preferred form of the invention, there is a shroud 52 which protectively encloses the junction of the second end portion 36 of the shaft with the impeller shaft 50. Also shown in FIG. 5 is the transfer conduit 16 and pump inlet 18.

Figure 6:
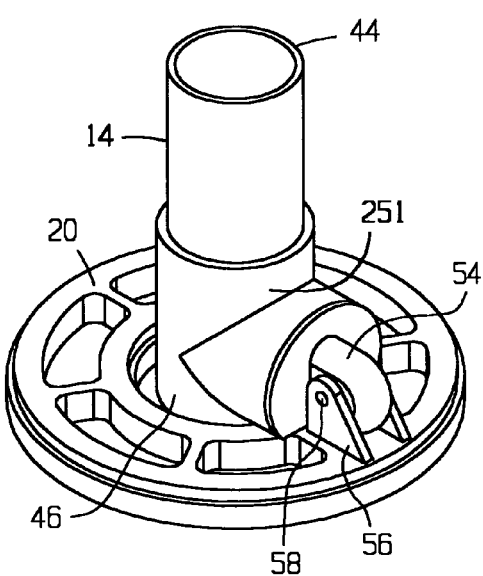
FIG. 6 shows a perspective view of the metal detector coil and pickup conduit of a device according to the present invention.

In FIG. 6 is shown a perspective view of the metal detector coil 20 disposed about the first end portion 46 of the pickup conduit 14 of a device according to the present invention. One preferred means of attachment of the metal detector coil 20 to the second end portion of the pickup conduit 14 comprises the employment of a T-fitting 251 at or as the second end portion of the pickup conduit. Such a provision conveniently permits a yoke bracket 56 on the metal detector coil 20 to engage with a boss 54 that is affixed to the "side" portion of the T-fitting 251 via means of a pin 58 that is commonly disposed through aligned holes in the yoke bracket 251 and the boss 54.

Figure 7:
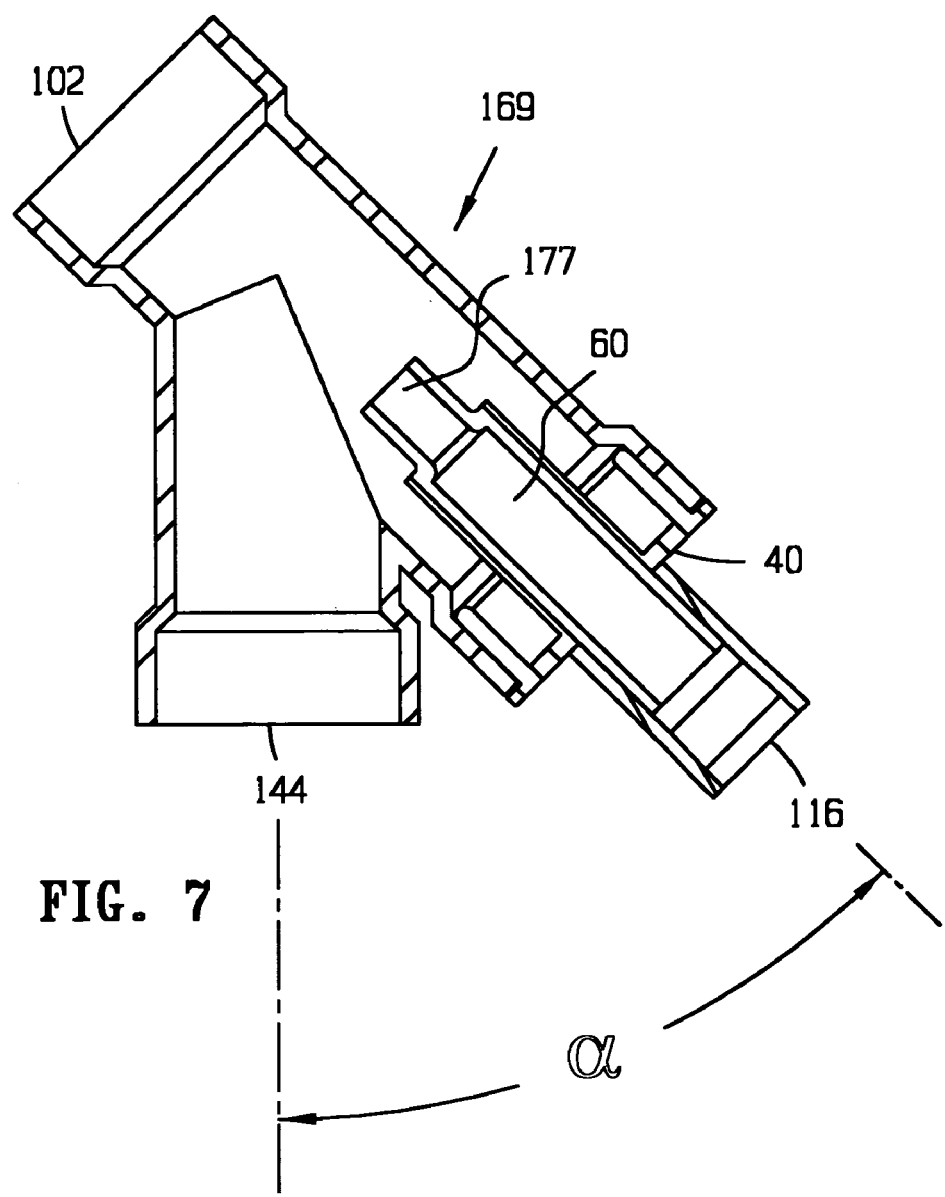
FIG. 7 shows a side cutaway view of the venturi effect junction sub-combination useful in a device according to the present invention.

In FIG. 7 is shown a side cutaway view of the venturi effect junction sub-combination useful in a device according to a preferred form of the present invention. According to such an embodiment, in this FIG. 7 the point of junction of the pickup conduit 14 with the main conduit embraces the use of an a single fitting 169. In such an embodiment, the first end portion 44 of the pickup conduit 14 is attached to the fitting 169 at the point labeled 144, and the main conduit 4 is attached to the fitting 169 at the point labeled 102, thus effectively causing the inlet portion of the main conduit 4 to exist at the point 40. The point at 116 is adapted to receive the outlet end of the transfer conduit 16, which causes water to be forced through the hollow tube 60 at a relatively high velocity at which it is discharged at the end 177 of the hollow tube into the main conduit 4, thus providing a venturi effect by virtue of a higher pressure existing at the end 177 of the hollow tube 60 than in the space within the pickup conduit 14.

FIG. 7 also shows angle alpha α, which describes the angle at which the centerline of the substantially linear pickup conduit intersects the centerline of the substantially linear main conduit portion. The angle alpha α may be any angle in the range of between about 15 degrees and about 75 degrees.

Figure 8:
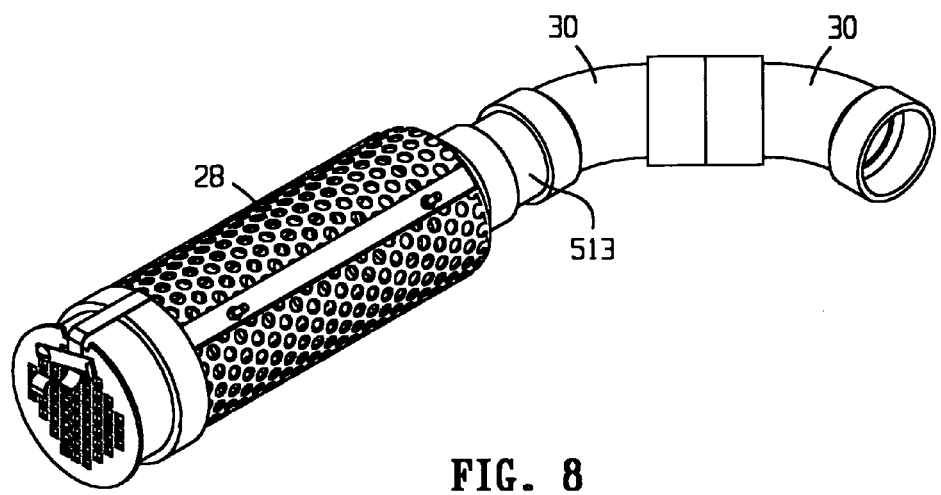
FIG. 8 shows a perspective view of a recovery basket sub-combination useful in accordance with the present invention.
Figure 9:
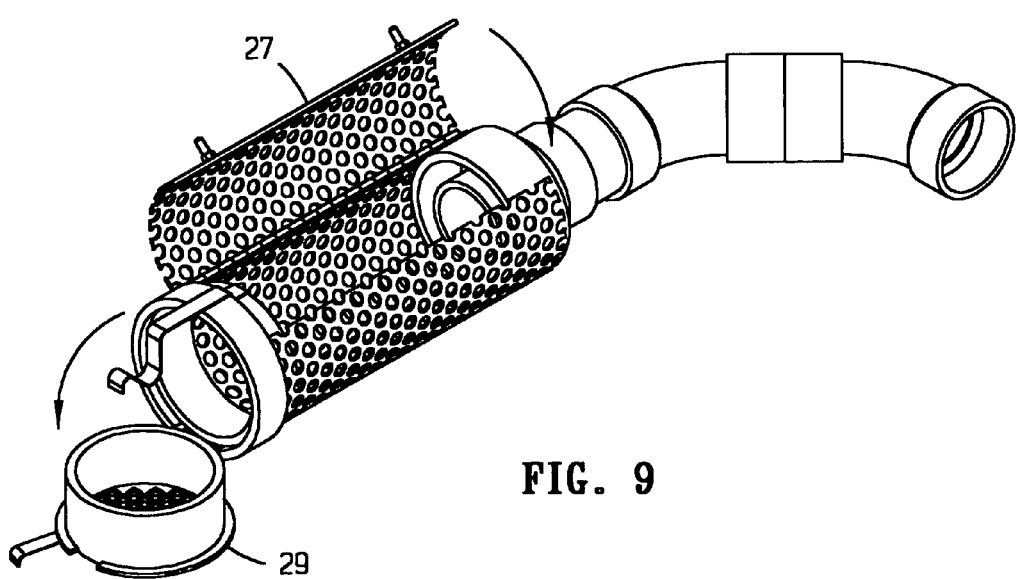
FIG. 9 shows a perspective view of a recovery basket sub-combination useful in accordance with the present invention with its door portions open.

In FIG. 8 is shown a perspective view of a recovery basket sub-combination 28 useful in accordance with the present invention. The recovery basket 28 in its simplest form is a tubular linear basket, comprising a screen or mesh which permits the escape of sand, dirt, and other debris that is smaller than the screen size that is admitted into the recovery basket 28 to escape, while retaining objects which are larger than the screen size. The recovery basket 28 has an inlet end 513 into which is pumped the contents of the main conduit 4 during operation of the device 69 (FIG. 2), preferably via the bend 30, which may comprise a bent conduit, pipe, or tube of similar diameter as the main conduit 4. In FIG. 9 is shown a perspective view of a preferred recovery basket sub-combination 28 useful in accordance with the present invention, comprising a side door portion 27 and a rear door portion 29. The side door 27 and rear door 29 are preferably hingedly attached portions of the recovery basket, which are provided with clasps or other conventional fastening means which enable them to be maintained in a securely closed position during the operation of the device 69 (FIG. 2). Opening one or both of the doors 27 and 29 enables the operator of the device 69 to retrieve the contents of the recovery basket 28.

Figure 10:
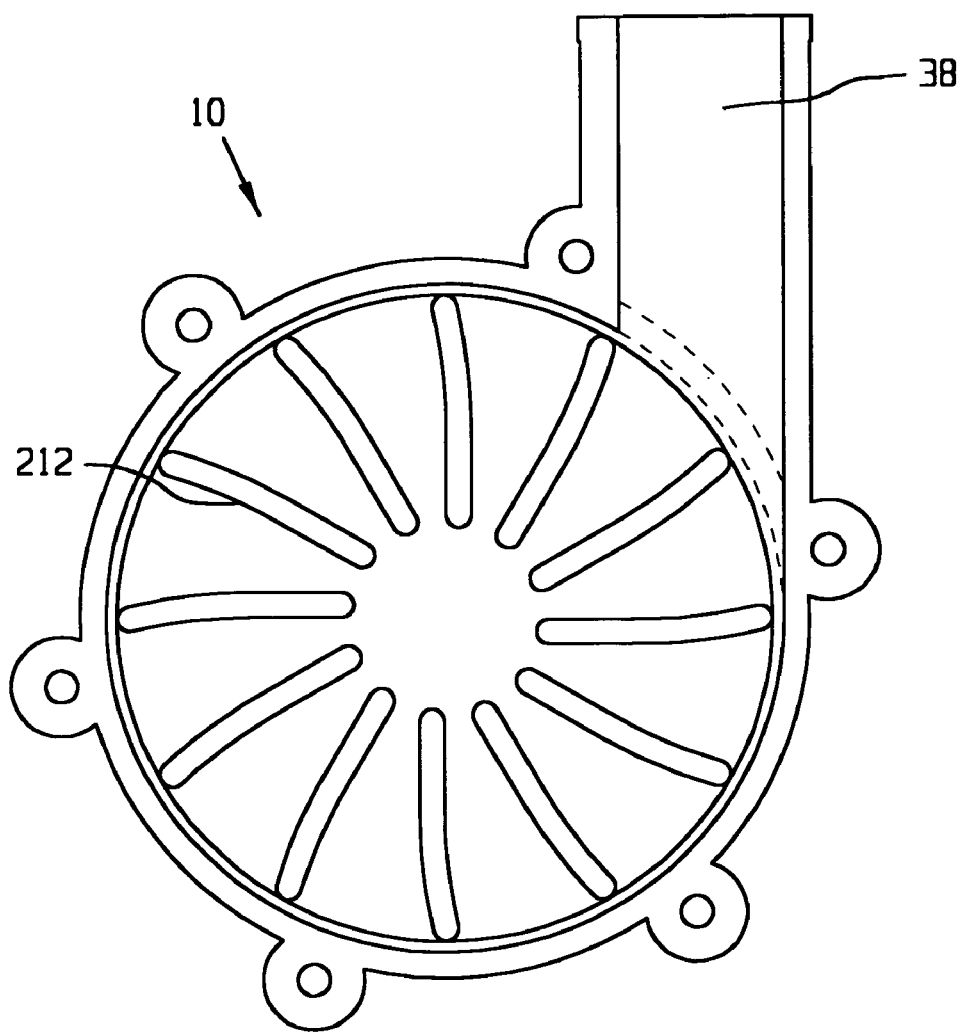
FIG. 10 shows a cutaway view of a liquid pump useful as a component part of a device according to the present invention.

In FIG. 10 is shown a cutaway view of the pump 10, with its impeller 212 and the pump outlet 38. A device 69 according to the present invention may employ any type of liquid pump known in the art which is shaft-driven, and shall not be construed as being limited by the illustration in FIG. 10.

The motor 24 may be any type of motor having an output shaft and capable of driving the drive shaft element of the invention sufficiently to drive the liquid pump. The motor 24 may be electrical, or may be a hydrocarbon-driven motor. It is preferred that the motor 24 is a gasoline-driven combustion engine. While both 2-cycle and 4-cycle engines are suitable for use in the present invention, is it is preferred that the engine be of the 2-cycle variety, as such engines deliver more power per volume displacement than do 4-cycle engines. The most preferred motor for use in this invention is in the range of between 18 and 24 cc of displacement internal combustion engine made by Echo Company, model number SRM-210.

Various metal detecting means are known in the art, which operate on the well-known principles of induction and accordingly comprise a metallic coil whose inductance is caused to be changed when placed in the vicinity of a metallic object. These types of metal detecting means are popular, and are available from a large number of companies, such as White's, Garrett, etc. Currently, the most preferred metal detecting means is that made by Fisher Company, under the trade name of Impulse, which uses a coil having 8 inches diameter.

The main conduit 4, pickup conduit 14, and bend 30 preferably comprise PVC or CPVC plumbing pipe, which may include joints along their length useful in one embodiment for providing couplings 8 to the shaft housing 2 when T-fittings are incorporated along the length of the main conduit 4. Although in principle it is possible to use main conduit 4, pickup conduit 14, and bend 30 having any diameter, is preferred that the diameter of these elements are in the range of between about 1 and 8 inches in diameter, when a device according to the invention is used to locate common items, such as coins, rings, and other jewelry and personal artifacts or relics. It is most preferred that the diameter of these elements are about 2 inches.

As mentioned, any liquid pump is suitable for use in the present invention. It is preferred that the liquid pump be capable of pumping between about one gallon per minute and about 25 gallons per minute at an rpm range between about 500 rpm and 5000 rpm. When the main conduit is about 3.5 inches in diameter, it is preferred that the liquid pump be capable of pumping about ten gallons per minute at an rpm of about 3000.

Consideration must be given to the fact that although this invention has been described and disclosed in relation to certain preferred embodiments, obvious equivalent modifications and alterations thereof will become apparent to one of ordinary skill in this art after reading and understanding this specification and the claims appended hereto. The present invention includes the subject matter defined by any combination of any one of the various claims appended hereto with any one or more of the remaining claims, including the incorporation of the features of any dependent claim, singly or in combination with other dependent claims into any independent claim, either alone or in combination with the features or limitations of any other independent claim, with the remaining dependent claims in their original text being read and applied to any independent claim so modified. Further, it is to be understood that the use of the word "about" as a modifier for a numerical value includes the actual numerical value itself.

What is claimed is:

1. A device useful for detecting and retrieving metallic objects from underwater locations, comprising:
    a) a substantially linear shaft housing having a first end portion, a second end portion, and a hollow interior space, inside of which space is disposed a driveshaft, said drive shaft having a first end portion and a second end portion;
    b) a liquid pump having an impeller, a fluid inlet, and a fluid outlet, wherein said impeller is in effective mechanical contact with said second end portion of said drive shaft;
    c) a substantially linear main conduit portion having an inlet end portion, an outlet end portion, and an interior space,
    d) a transfer conduit means for conveying liquid from said fluid outlet of said liquid pump to said inlet portion of said main conduit portion;
    e) a pickup conduit having a first end portion, a second end portion, and an interior space, wherein said first end portion of said pickup conduit is attached to said main conduit such that the interior spaces of said main conduit and said pickup conduit are in effective fluid communication with one another; and
    f) a metal detecting means having a coil portion, wherein said coil portion is annularly disposed about said pickup conduit portion,
    wherein said shaft housing and said main conduit portion are oriented to be substantially parallel to one another.

2. A device according to claim 1 wherein said transfer conduit means comprises a transfer conduit having an inlet and an outlet, wherein said inlet of said transfer conduit is in fluid communication with the outlet of said liquid pump, and wherein the outlet of said transfer conduit is in fluid communication with said inlet portion of said main conduit portion.

3. A device according to claim 1 wherein said shaft housing and said main conduit portion are rigidly connected to one another.

4. A device according to claim 1 further comprising a recovery basket attached to said outlet end portion of said main conduit portion.

5. A device according to claim 4 wherein said recovery basket is attached to said outlet end portion of said main conduit portion by means of a conduit that is bent at an angle in the range of between about 60 degrees and about 110 degrees.

6. A device according to claim 1 further comprising: g) a motor having an output shaft, wherein said output shaft of said motor is in effective mechanical contact with said first end portion of said drive shaft.

7. A device according to claim 4 further comprising: g) a motor having an output shaft, wherein said output shaft of said motor is in effective mechanical contact with said first end portion of said drive shaft.

8. A device according to claim 7 wherein said recovery basket is attached to said outlet end portion of said main conduit portion by means of a conduit that is bent at an angle in the range of between about 60 degrees and about 110 degrees.

9. A device according to claim 1 wherein said pickup conduit is substantially linear and intersects said main conduit portion at any angle in the range of between about 15 degrees and about 75 degrees.

10. A device according to claim 9 wherein said pickup conduit is substantially linear and intersects said main conduit portion at any angle in the range of between about 30 degrees and about 60 degrees.

11. A device according to claim 9 wherein said pickup conduit is substantially linear and intersects said main conduit portion at an angle of about 45 degrees.

12. A device according to claim 7 wherein said pickup conduit is substantially linear and intersects said main conduit portion at any angle in the range of between about 75 degrees and about 15 degrees.

13. A device according to claim 12 wherein said pickup conduit is substantially linear and intersects said main conduit portion at any angle in the range of between about 60 degrees and about 30 degrees.

14. A device according to claim 12 wherein said pickup conduit is substantially linear and intersects said main conduit portion at an angle of about 45 degrees.

* * * * *